United States Patent
Drenzyk

[11] 3,820,274
[45] June 28, 1974

[54] FINGER SAVER PLIERS
[76] Inventor: Tefel F. Drenzyk, 4 Prospect Pl., Torrington, Conn. 06790
[22] Filed: Aug. 2, 1972
[21] Appl. No.: 277,260

[52] U.S. Cl. ................................................ 43/53.5
[51] Int. Cl. ............................................ A01k 97/00
[58] Field of Search .......... 43/53.5; 128/17, 19; 7/4, 7/5; 81/5.1 R

[56] References Cited
UNITED STATES PATENTS

| | | | |
|---|---|---|---|
| 888,484 | 5/1908 | Gehorsam | 43/53.5 UX |
| 2,867,937 | 1/1959 | Little | 43/53.5 |
| 3,012,360 | 12/1961 | Creel et al. | 43/53.5 |
| 3,106,035 | 10/1963 | Tennyson | 43/53.5 |

Primary Examiner—Louis G. Mancene
Assistant Examiner—J. Q. Lever
Attorney, Agent, or Firm—Clarence A. O'Brien; Harvey B. Jacobson

[57] ABSTRACT

Manually usable fish mouth opening pliers comprising a pair of similar lever units. Each unit embodies a handle having an outer end provided with a long-nosed pincers-type jaw. Both units have median overlapping portions crossed and pivotally connected in a manner that the pincers-type jaws are openable and closable, that is, in clampable and releasable manner. Simple and practical means is mounted on the handle of one unit and is designed and functions to engage, spread and prop the upper jaw of the mouth of the fish open while, at the same time, the lower jaw is grippingly clamped and held open by the jaws of the pliers.

1 Claim, 3 Drawing Figures

PATENTED JUN 28 1974   3,820,274

FINGER SAVER PLIERS

The present invention relates to a hand tool, more particularly, a pair of pliers which, as usual, embody companion lever units, the handle of one unit being novel in that it is provided with means which is capable of spreading and propping the upper jaw of the mouth of the fish open whereby to permit access to be had to a fishhook which the fisherman desires to dislodge and remove.

Dislodging and removing a fishhook from the mouth of a fish is time-consuming and, in many instances is fraught with danger and difficulties. Under the circumstances and to cope with the problem many and varied fishhook disgorging and removing tools and implements have been devised by others working in this field of endeavor.

An object of the present invention is to utilize a pair of conventional type pliers having long-nosed jaws which in use can be closed and clampingly engaged with the lower jaw of the fish and to, at the same time, provide the handle of one of the pliers units with means, a prong for instance, which is so mounted and angularly related that when the pliers jaws are closed the prong projects at an angle to prop the upper jaw of the fish in a wide-open position, whereby to permit access to be had to the fishhook for quick and easy removal.

Briefly the concept pertains to implementing or equipping the handle of one pliers unit with a simple elongated prong. To the ends desired one end, the lower end for example, is fixed atop the pliers handle adjacent the pivotal connection, the free end of the prong serving to assume the desired angular position when the prong is utilized as a prop for spreading the jaws of the fish for ready hook-dislodging and removal purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
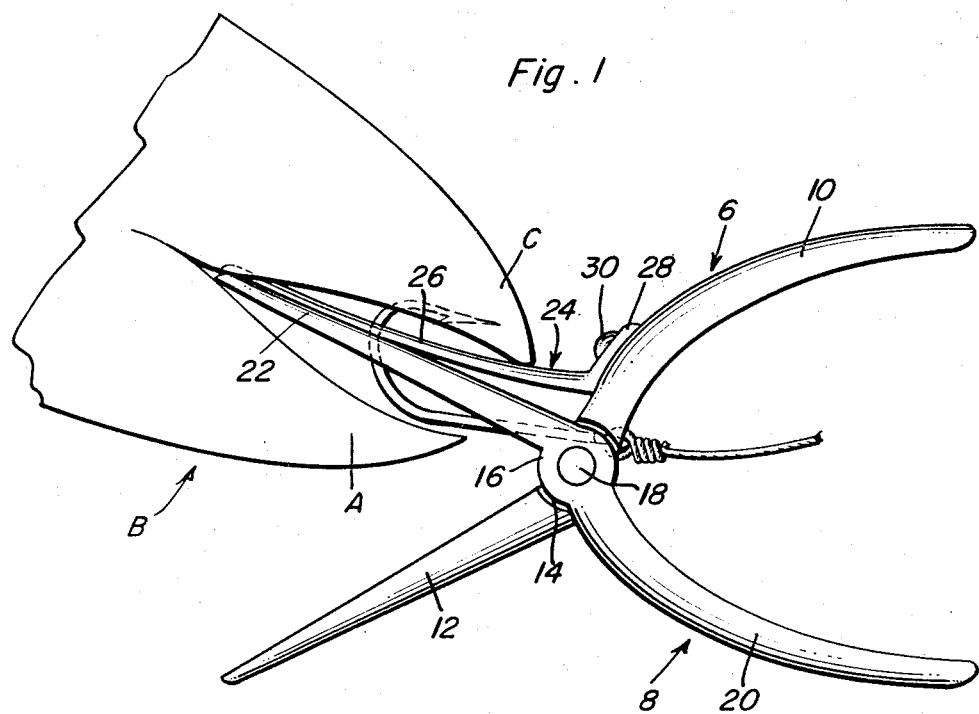
FIG. 1 is a view in side elevation showing the improved fish mouth pliers and how the simple prong on the handle thereof coordinates with one of the open jaws to expedite the initial step of inserting the prong and jaw between the partially closed jaws of the hooked fish.

As is evident from the several views of the drawing, the pliers are of a substantially conventional or well-known type. This is to say, one lever unit is denoted by the numeral 6 and the companion or complemental lever unit is denoted at 8. The unit 6 comprises a curvate or similar handle 10 which is provided at its outer or forward end with a tapering or long-nosed jaw 12. The junctional portion between the handle and jaw is constructed in a common manner as is denoted at 14 to accommodate a similarly constructed intermediate portion 16, constituting a part of the jaw unit 8. Accordingly both portions 14 and 16 are overlapped and crossed and are pivotally riveted or otherwise connected together as at 18. The handle of the unit 6 is denoted at 20 and the long-nosed tapering jaw is denoted at 22. The means which is added to transform a simple pair of pliers into a unique hook dislodging and removing implement or tool may be of some construction other than that shown but experience has demonstrated that all that is really necessary to accomplish the desired result is to provide a simple expedient and economical prong 24. This prong is of tapering construction and in a manner of speaking resembles one of the jaws 12 or 22. This is to say it is a tapering prong 26, one end portion of which is fashioned into and provides a laterally directed foot 28, said foot being superimposed upon the convex surface of the handle 10 and being screwed or otherwise rigidly fastened in place as at 30 adjacent to the aforementioned pivotal connection 18.

As is thought to be clear from the several views of the drawing, the pair of pliers herein employed is not altered. Experience has shown that while there are many different styles and types of pliers, the adaptation herein shown and described is best suited for the purpose in that the long-nosed jaws are ideally suitable to accomplish the insertion step shown in FIG. 1 as well as the clamping and propping step shown in FIG. 2. By thus using a conventional pair of pliers and adding the generally L-shaped prong 24 and being sure to locate the point of attachment near the point of pivot, the thus provided prong transforms the pliers into a tool, that is a tool which is implemented to permit one jaw 22 and the then adjacent prong 24 to be piloted into the mouth of the fish whereupon when the jaws 22 and 12 are clamped on the lower jaw A of the fish B, the upper jaw is propped up and open as at C.

Figure 2:
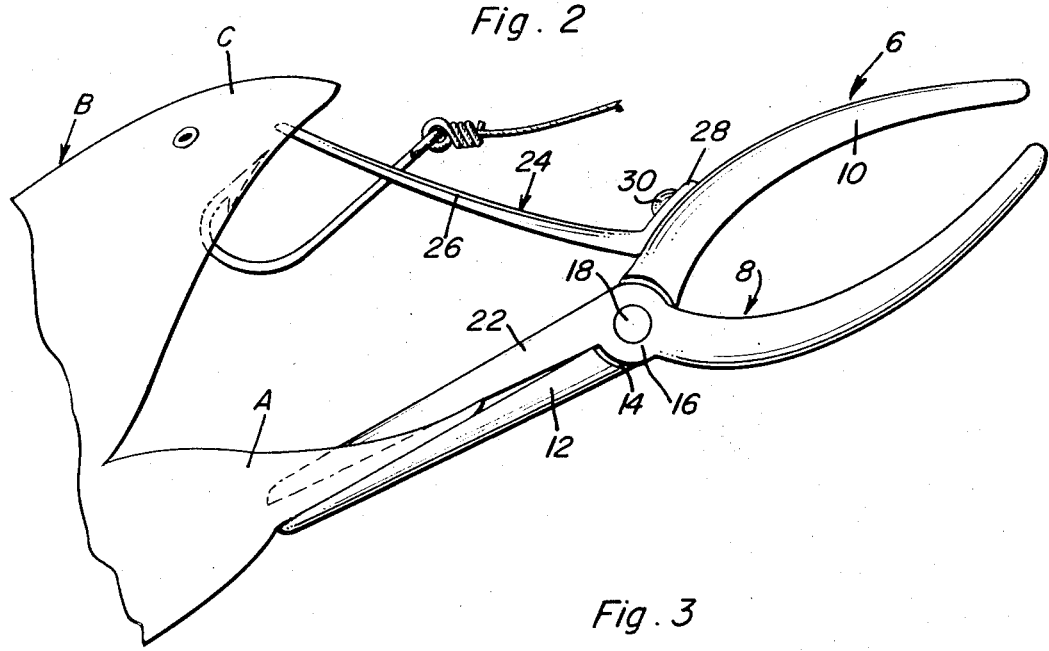
FIG. 2 is a view in side elevation similar to FIG 1 and showing how the jaws of the pliers are grippingly engaged with the lower jaw of the fish and how the elevating prop or prong functions to spread the fish jaws to a point which will expose and expedite removing the fishhook.
Figure 3:
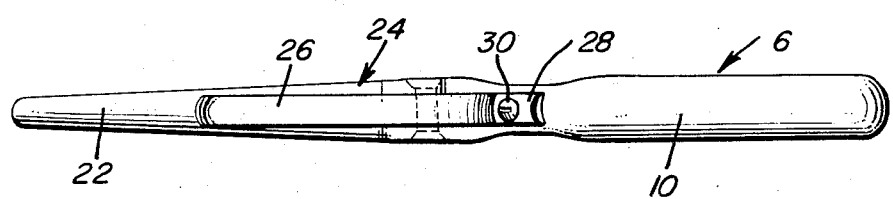
FIG. 3 is a top plan view of the improved pliers when not in use.

Experience and repeated use of the innovation disclosed shows that the steps illustrated in FIGS. 1 and 2, respectively, can be expeditiously accomplished. It will be evident too that the job desired can be accomplished not only expeditiously but with a degree of safety not ordinarily achieved when employing prior art tools, even those which have attained widespread adoption and use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use by a fisherman when he is called upon to dislodge and remove a fishhook from the mouth of a hooked fish, manually applicable and removable fish mouth opening finger protecting pliers comprising: a pair of structurally and functionally analogous lever units, each unit embodying a longitudinally bowed handle having a forward end provided with a longitudinally straight elongated tapering jaw, said units having like flat-faced median overlapping portions, crossed and pivotally connected with each other in a manner that said units are disposed in a common plane and are openable and closable in a well known clampable and releasable manner, and a substantially straight elongated forwardly tapering prong substantially commensurate in length with the length of the jaws of said units, said prong having a forward end capable of being inserted in the mouth of the fish in a manner to prop the upper jaw of the fish open while the lower jaw of said fish is simultaneously grippingly clamped and held by the closed jaws of said lever units, said prong having a rearward end fixed atop an adjacent coordinating handle, said rearward end of said prong being located and anchored rearwardly of but adjacent said pivotal connection, both of said jaws and said prong being interrelated and maintained in a common plane.

* * * * *